(12) United States Patent
Dhupar et al.

(10) Patent No.: US 9,684,638 B2
(45) Date of Patent: **\*Jun. 20, 2017**

(54) ACCESSING LOCATION-BASED INFORMATION ON A MOBILE DEVICE

(71) Applicant: International Business Machines Corporation, Armonk, NY (US)

(72) Inventors: Vimal Dhupar, Gurgaon (IN); Manish Kataria, Delhi (IN)

(73) Assignee: International Business Machines Corporation, Armonk, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 15/296,087

(22) Filed: Oct. 18, 2016

(65) Prior Publication Data

US 2017/0034655 A1 Feb. 2, 2017

Related U.S. Application Data

(63) Continuation of application No. 14/973,791, filed on Dec. 18, 2015, now Pat. No. 9,563,612, which is a (Continued)

(51) Int. Cl.
*H04W 4/02* (2009.01)
*H04W 48/16* (2009.01)
(Continued)

(52) U.S. Cl.
CPC .... *G06F 17/2247* (2013.01); *G06F 17/30887* (2013.01); *H04L 67/02* (2013.01);
(Continued)

(58) Field of Classification Search
CPC ....... H04W 4/02; H04W 36/32; H04W 48/16; H04W 48/18; H04W 64/00
(Continued)

(56) References Cited

U.S. PATENT DOCUMENTS 7,698,377 B2 4/2010 Parekh et al.
8,447,332 B2 5/2013 Weinreich et al.
(Continued)

FOREIGN PATENT DOCUMENTS

AU 2015201799 A1 4/2015

OTHER PUBLICATIONS

Dhupar et al., Entitled "Accessing Location-Based Information on a Mobile Device", U.S. Appl. No. 15/292,255, filed Oct. 13, 2016, pp. 1-13.
(Continued)

*Primary Examiner* — Sam Bhattacharya
(74) *Attorney, Agent, or Firm* — Edward P. Li

(57) ABSTRACT

A computer system for accessing location-based information on a mobile device. The computer system determines whether a default HTML including information of a location is available, in response to determining that a wireless network at the location is available. The computer system determines geographical coordinates of the location and calculates a URL and the default HTML using the geographical coordinates, in response to determining that the wireless network at the location is not available and in response to determining that the default HTML is not available. The computer system displays one or more pages created by the default HTML that is calculated. The computer system displays the one or more pages created by the default HTML that is available, in response to determining that the default HTML is available.

1 Claim, 2 Drawing Sheets

Related U.S. Application Data continuation of application No. 14/665,146, filed on Mar. 23, 2015.

(51) Int. Cl.
*G06F 17/22* (2006.01)
*H04L 29/08* (2006.01)
*H04W 64/00* (2009.01)
*G06F 17/30* (2006.01)

(52) U.S. Cl.
CPC ............. *H04L 67/18* (2013.01); *H04W 4/021* (2013.01); *H04W 4/025* (2013.01); *H04W 48/16* (2013.01); *H04W 64/00* (2013.01)

(58) Field of Classification Search
USPC ............ 455/404.2, 456.1–456.3, 456.6, 457; 370/328, 329, 331
See application file for complete search history.

(56) References Cited

U.S. PATENT DOCUMENTS

| | | |
|---|---|---|
| 8,630,662 B2 | 1/2014 | Herz |
| 2002/0199018 A1 | 12/2002 | Diedrich et al. |
| 2014/0171117 A1 | 6/2014 | LaMarca et al. |
| 2016/0283448 A1 | 9/2016 | Dhupar et al. |
| 2016/0286347 A1 | 9/2016 | Dhupar et al. |

OTHER PUBLICATIONS

IBM Appendix P.: "List of IBM Patents or Patent Applications Treated as Related", Dated Nov. 14, 2016, 2 pages.

ACCESSING LOCATION-BASED INFORMATION ON A MOBILE DEVICE

BACKGROUND

The present invention relates generally to mobile devices, and more particularly to accessing location-based information on a mobile device.

Easy access to Internet has revolutionized the way in which we gather information about a subject or interest topic. People no longer have to wait for information in conventional media, such as newspapers, magazines, television channels; instead, people can get the information from Internet as per convenience and requirement. The recent innovations in making the computational devices much more portable have made it even more convenient for end users to get the information. Now, the users no longer have to be confined in walls looking at a desktop to get the information. The users can carry the devices, such as laptops, netbooks, smartphones, and tablets, and get the information on the move. While there have been tremendous advancements in the devices, the mechanism for searching the information has remained pretty constant. For example, a user is standing in a movie theater and wants to use a handheld device to get the schedules of movies which are playing or will be playing. The user has to do a search to find a correct website of a company who owns the movie theater. The user will be given a long list and have to manually find the correct one from the long list. Clearly, this approach puts the onus for reaching the information on consumers. It is a lose-lose situation for both consumers and businesses. Businesses lose opportunities if their customers cannot reach their sites easily; customers, on the other hand, can feel frustrated and spend more in searching for correct sites.

SUMMARY

A computer system for accessing location-based information on a mobile device is provided. The computer system comprises one or more processors, one or more computer readable tangible storage devices, and program instructions stored on at least one of the one or more computer readable tangible storage devices for execution by at least one of the one or more processors. The program instructions are executable to identify, by a processor on the mobile device, a location of the mobile device. The program instructions are executable to determine, by the processor, whether a wireless network at the location is available, wherein the wireless network is accessible by the mobile device. The program instructions are further executable to determine, by the processor, whether a default HTML including information of the location is available, in response to determining that the wireless network at the location is available. The program instructions are further executable to determine, by the processor, geographical coordinates of the location, and calculate, by the processor, a URL and the default HTML using the geographical coordinates, in response to determining that the wireless network at the location is not available and in response to determining that the default HTML is not available. The program instructions are further executable to display, by the processor, one or more pages created by the default HTML that is calculated. The program instructions are further executable to display, by the processor, the one or more pages created by the default HTML that is available, in response to determining that the default HTML is available.

DETAILED DESCRIPTION

In embodiments of the present invention, an intelligent system provides a standard mechanism which allows a portable device to access location specific resources based on its geographical location without remembering any URLs (uniform resource locators) or invoking a search for retrieving such URLs. Further, the system establishes a bridge between an information provider and a consumer, removing the need for any external tools like web search, bookmarking, etc.

The system has the following advantages. (1) A user can fetch the location specific information quickly. The user just has to remember one standard URL. Furthermore, the system can use a mobile application or a browser plugin, which can automatically fetch contents from this standard URL. (2) The system is beneficial to information suppliers. The information suppliers can provide different content to audience who are actually present in their locations. (3) The system allows the providers to attract customers by running schemes such as lucky draws without the hassle of manually collecting entry forms, or bombarding SMS with configuration settings to customers. (4) The system can provide more precise information about their surroundings. For example, in a shopping mall, the user can be made aware of various stores, offers running, promotional schemes, emergency exits, etc. For example, in a movie theater, the information can have an entire movie list of the specific movie theater. (5) A user can retrieve all the information without remembering or searching the URLs of the location.

There are two standard ways of accessing information. The first way is local. Whenever a user is within a range of a wireless network, for example a WIFI network, the wireless network can enable a default page such as /information.html. (Note: the term "WIFI" may be subject to trademark rights in various jurisdictions throughout the world and are used here only in reference to the products or services properly denominated by the marks to the extent that such trademark rights may exist.) This way allows internal navigation to resources that a publisher wants to share with consumer; for example, movie schedules in a specific movie theater, promotions, notices, etc. The second way is external. A device automation concatenates geographical coordinates and accesses a URL such as http://geo-cords/information.html to display one or more pages.

Embodiments of the present invention are now described in detail with reference to the accompanying FIGs.

Figure 1:
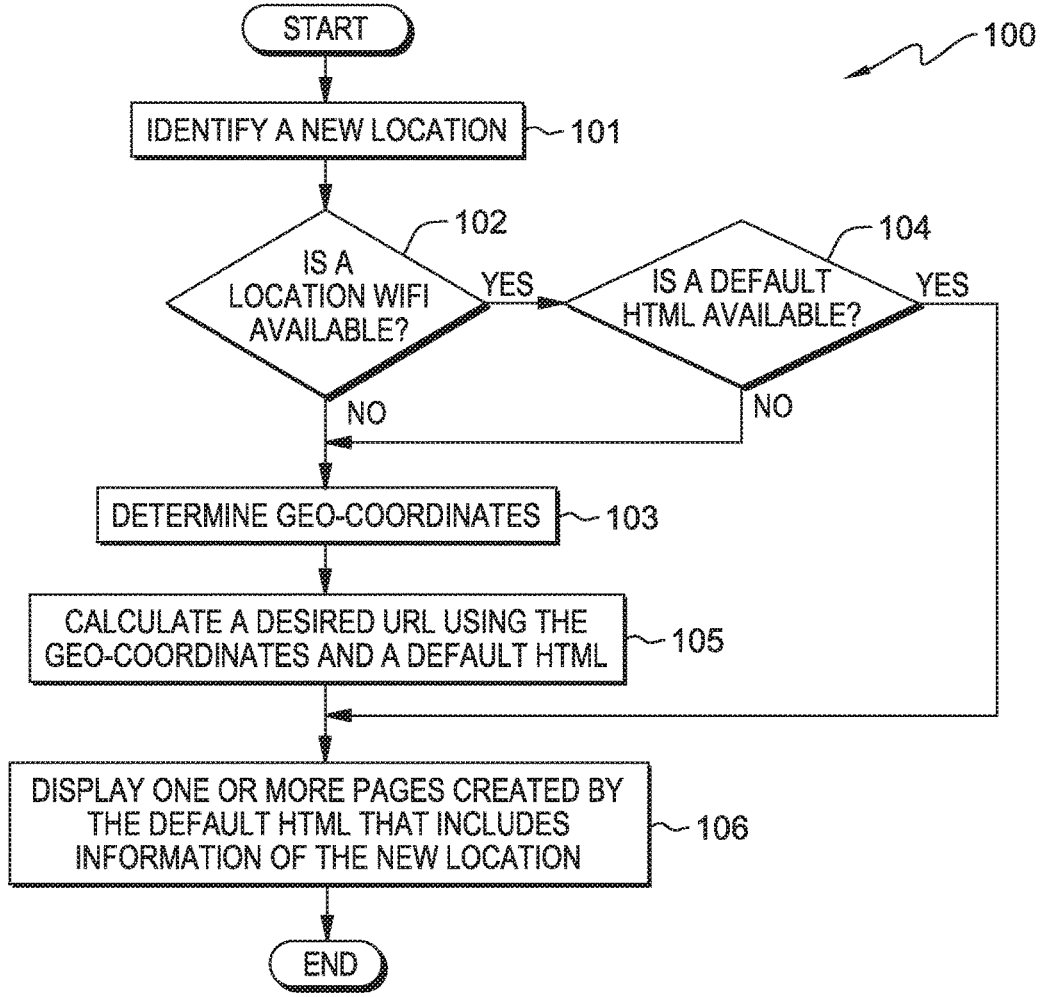
FIG. 1 is a flowchart showing operational steps for accessing location-based information on a mobile device, in accordance with one embodiment of the present invention.

FIG. 1 is flowchart 100 showing operational steps for accessing location-based information on a mobile device, in accordance with one embodiment of the present invention. The steps are implemented by a computer program for accessing location-based information on a mobile device. In the discussion with reference to FIG. 1, WIFI is used as an example of a wireless network.

At step 101, the computer program identifies a new location. At decision block 102, the computer program determines whether a location WIFI is available. In response to determining that the location WIFI is not available (NO branch of decision block 102), the computer program, at step 103, determines geographical coordinates of the new location. At step 105, the computer program calculates a desired URL using the geographical coordinates and a default HTML, such as http://geo-cords/information.html. At step 106, the computer program displays one or more pages created by the default HTML that includes information of the new location. At this step, the URL calculated at step 105 is used to access the location-based information.

In response to determining that the location WIFI is available (YES branch of decision block 102), the computer program, at decision block 104, determines whether a default HTML is available. In response to determining that default HTML is available (YES branch of decision block 104), the computer program processes step 106 to display the one or more pages created by the default HTML that includes information of the new location. Under this situation, an available URL of the location is used to access the location-based information.

In response to determining that the default HTML is not available (NO branch of decision block 104), the computer program processes steps 103-106 to determine the geographical coordinates of the new location, calculates the desired URL using the geographical coordinates and calculates the default HTML, and then displays the one or more pages created by the default HTML that includes information of the new location, by accessing the URL calculated at step 105.

Figure 2:
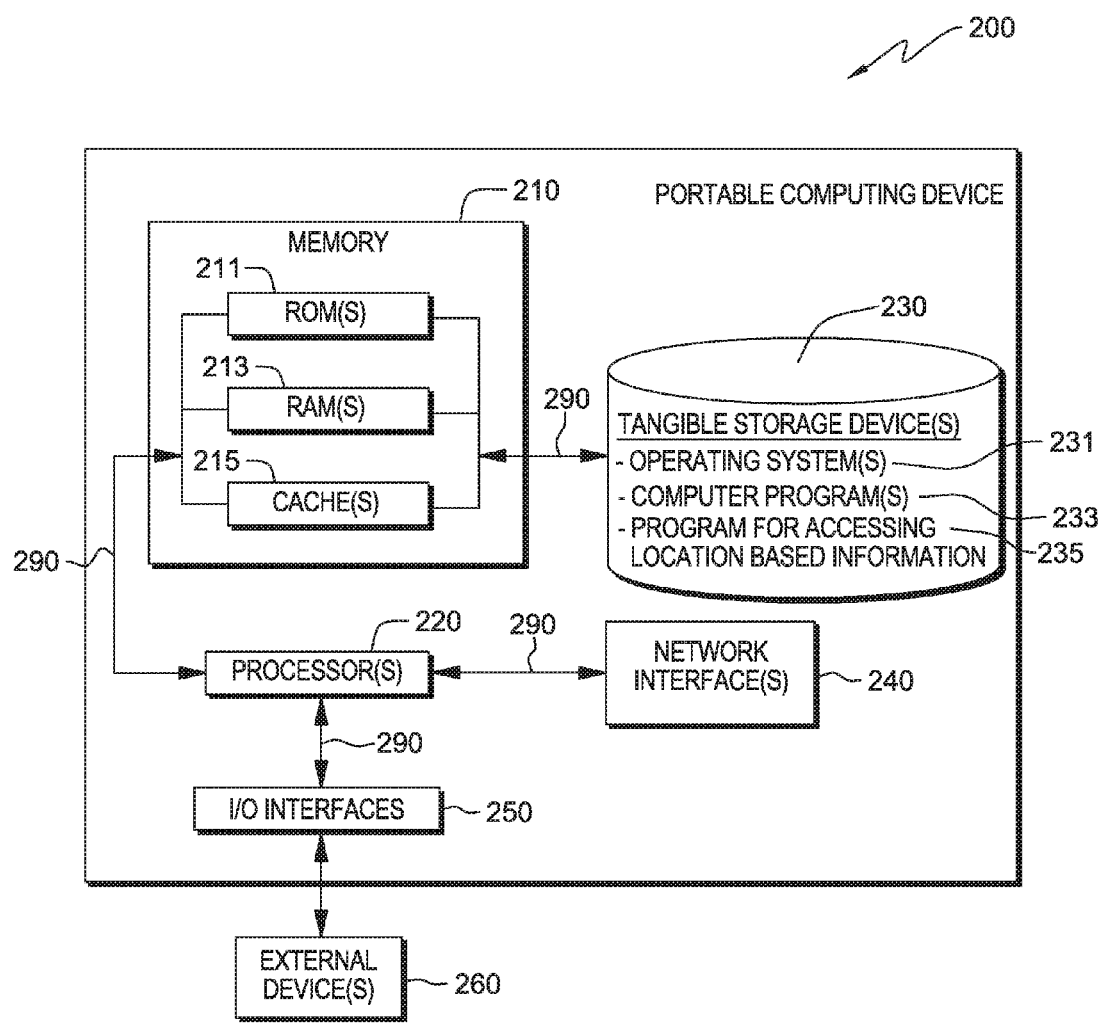
FIG. 2 is a diagram illustrating components of a mobile device hosting a computer program for accessing location-based information on a mobile device, in accordance with one embodiment of the present invention.

FIG. 2 is a diagram illustrating components of mobile device 200 hosting computer program 235 for accessing location-based information on mobile device 200, in accordance with one embodiment of the present invention. It should be appreciated that FIG. 2 provides only an illustration of one implementation and does not imply any limitations with regard to the environment in which different embodiments may be implemented.

Referring to FIG. 2, mobile device 200 includes processor(s) 220, memory 210, and tangible storage device(s) 230. In FIG. 2, communications among the above-mentioned components of mobile device 200 are denoted by numeral 290. Memory 210 includes ROM(s) (Read Only Memory) 211, RAM(s) (Random Access Memory) 213, and cache(s) 215. One or more operating systems 231 reside on one or more computer readable tangible storage device(s) 230. The computer program 235 for accessing location-based information on mobile device 200 resides on one or more computer readable tangible storage device(s) 230. One or more computer programs 233 for other functionalities of mobile device 200 also reside on one or more computer readable tangible storage device(s) 230. Mobile device 200 further includes I/O interface(s) 250. I/O interface(s) 250 allows for input and output of data with external device(s) 260 that may be connected to mobile device 200. Mobile device 200 further includes network interface(s) 240 for communications between mobile device 200 and a wireless network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for accessing location-based information on a mobile device, the computer system comprising:
   one or more processors, one or more computer readable tangible storage devices, and program instructions stored on at least one of the one or more non-transitory computer readable tangible storage devices for execution by at least one of the one or more processors, the program instructions executable to:
   identify, by a processor on the mobile device, a location of the mobile device;
   determine, by the processor, whether a wireless network at the location is available, the wireless network accessible by the mobile device;
   determine, by the processor, whether a default HTML including information of the location is available, in response to determining that the wireless network at the location is available;
   determine, by the processor, geographical coordinates of the location, and calculate, by the processor, a URL and the default HTML using the geographical coordinates, in response to determining that the wireless network at the location is not available and in response to determining that the default HTML is not available;
   display, by the processor, one or more pages created by the default HTML that is calculated; and
   in response to determining that the default HTML is available, display, by the processor, the one or more pages created by the default HTML that is available.

\* \* \* \* \*